(12) United States Patent
Nagai et al.

(10) Patent No.: US 6,745,639 B2
(45) Date of Patent: Jun. 8, 2004

(54) GEARED MOTOR

(75) Inventors: Atsushi Nagai, Nagano (JP); Ikuo Agematsu, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 10/134,619

(22) Filed: Apr. 30, 2002

(65) Prior Publication Data

US 2002/0162413 A1 Nov. 7, 2002

(30) Foreign Application Priority Data

May 1, 2001 (JP) ...................................... P2001-134007

(51) Int. Cl.[7] ................................................. F16H 1/14
(52) U.S. Cl. ........................................ 74/420; 74/421 A
(58) Field of Search ............................... 74/420, 421 A, 74/424

(56) References Cited

U.S. PATENT DOCUMENTS

| | | | | |
|---|---|---|---|---|
| 4,270,783 A | * | 6/1981 | Sorensen et al. | ......... 292/336.3 |
| 6,112,984 A | * | 9/2000 | Snavely | ....................... 235/379 |
| 6,401,561 B1 | * | 6/2002 | Hosle | ........................... 74/420 |

* cited by examiner

Primary Examiner—David Fenstermacher
(74) Attorney, Agent, or Firm—Sughrue Mion, PLLC

(57) ABSTRACT

A geared motor has a motor unit and a plurality of transmission gears for transmitting a driving force from the motor unit to the output shaft. Shaft supporting parts for supporting both ends of the shafts of the transmission gears are formed in the surfaces of a casing which covers the output shaft of the motor unit and the transmission gears. An insertion hole is formed passing through a coupling surface to which an output-side end surface of the motor unit is fastened. The transmission gears are a first bevel gear and a second bevel gear meshing with the bevel gear and having a shaft oriented in a direction orthogonal to the shaft of the bevel gear. One of the first and second bevel gears includes shaft support parts for supporting both ends of the bevel gear.

6 Claims, 5 Drawing Sheets

GEARED MOTOR

The present application is based on Japanese Patent Application No. 2001-134007, which is incorporated herein by reference.

BACKGROUND OF THE INVENTION

The present invention relates to a gear-train coupled motor coupled with a gearbox containing a reduction gear train.

There is known a motor in which a motor unit is coupled with a gear box containing a reduction gear train. This type of motor will be referred to as a geared motor. The geared motor has widely been used in various types of devices. The motor, inter alia, a stepping motor, is used as a drive source which drives those various types of devices while controlling the devices. This type of motor is used for the focusing, zooming or the like in digital still cameras, digital video cameras, and further it has found its application in audio/video devices, office automation (OA) devices and others.

The geared motor includes a motor unit and a plurality of transmission gears for transmitting a driving force from the motor unit to the output part. In the conventional geared motor, those gears, which are located between the motor output shaft of the motor unit and the output part are spur gears. FIG. 6 is a conceptual figure showing a conventional geared motor. In FIG. 6, a gear box 52 is fixed to one end of a motor unit 51. A motor shaft is projected from one end of the motor unit 51 toward the gear box 52, and a small-diameter gear 54 is secured to the motor shaft. The gear 54 is in mesh with a gear 55. A gear 57 is in mesh with a small-diameter bevel gear 56 integral with the gear 55. A gear 59 is in mesh with a small-diameter gear 58 integral with the gear 57. The gear 59 includes a small-diameter gear 60 integral with the former. Those gears are all spur gears. Accordingly, the shafts of those gears are oriented in a direction perpendicular to the mounting surface of the motor unit 51, which is used when the gear box 52 is mounted on the motor unit. A rotational driving force is output from the small-diameter gear 60 or a rotary shaft integral with the small-diameter gear.

In the conventional geared motor, the transmission gear train consists of spur gears. All the shafts of the transmission gear train are parallel to the rotary shaft of the motor unit 51, and are arranged in the outer radial direction of the motor unit 51. Accordingly, the gear box 52 extends in a direction perpendicular to the shaft direction of the motor unit 51. In assembling the geared motor into a device, a space within the device is greatly occupied by the gear box 52 of the geared motor in the widthwise direction. This space occupation hinders the approach of making the device compact and lessens the freedom of mounting the geared motor. In connection with this, there is an approach in which the transmission gear train is disposed along an arc with its center being the motor shaft, with an intention of minimizing the expansion of the gear box 52 relative to the motor unit 51. In this approach, the gear box expands radially and equiangularly from the motor shaft. This spatial expansion also hinders the securing of the device compactness and good freedom of the geared motor mounting.

SUMMARY OF THE INVENTION

Accordingly, an object of the present invention is to provide a geared motor in which the overall width of the device is reduced by reducing the device size expansion in the width direction.

According to the present invention, there is provided a first geared motor comprising: a motor unit having an motor output shaft; a plurality of transmission gears for transmitting a driving force of the motor unit to an output part, the transmission gears being supported by transmission gear shafts; a casing which covers said motor output shaft and said transmission gears, including a pair of opposed walls opposed substantially in parallel with each other and a coupling surface being arranged substantially in parallel with said transmission gear shafts; wherein shaft supporting parts for supporting ends of the transmission gear shafts of the transmission gears, formed on said opposed walls of said casing; an insertion hole penetrating said coupling surface, and an output-side end surface of said motor unit is fastened to said coupling surface.

According to another aspect of the invention, there is provided a second geared motor comprising: a motor unit; a plurality of transmission gears for transmitting a driving force from the motor unit to the output part; wherein said transmission gears includes a first bevel gear supported by a first shaft, and a second bevel gear meshing with said first bevel gear and supported by a second shaft oriented in a direction orthogonal to said first shaft of said first bevel gear; and at least one of said first and second bevel gears is provided with shaft support parts so that both ends of said at least one of said first and second bevel gears are supported.

In the second geared motor, a casing for accommodating a plurality of gears therein is made of resin, and the shaft support parts are formed in the casing.

In a preferred embodiment, the second bevel gear is mounted on the motor output shaft.

In another preferred embodiment, the motor output shaft of the motor unit includes a stepped part formed by making the output shaft different in diameter, and the stepped part serves as a thrust receiver for the second bevel gear.

In a further preferred embodiment, the shafts of the bevel gear and the second bevel gear are both supported at both ends thereof, and the ends of the shafts of the bevel gear and the second bevel gear, which are located close to each other, are supported by a common shaft support.

DETAILED DESCRIPTION OF THE PREFERRED EMBODIMENTS

Figure 1:
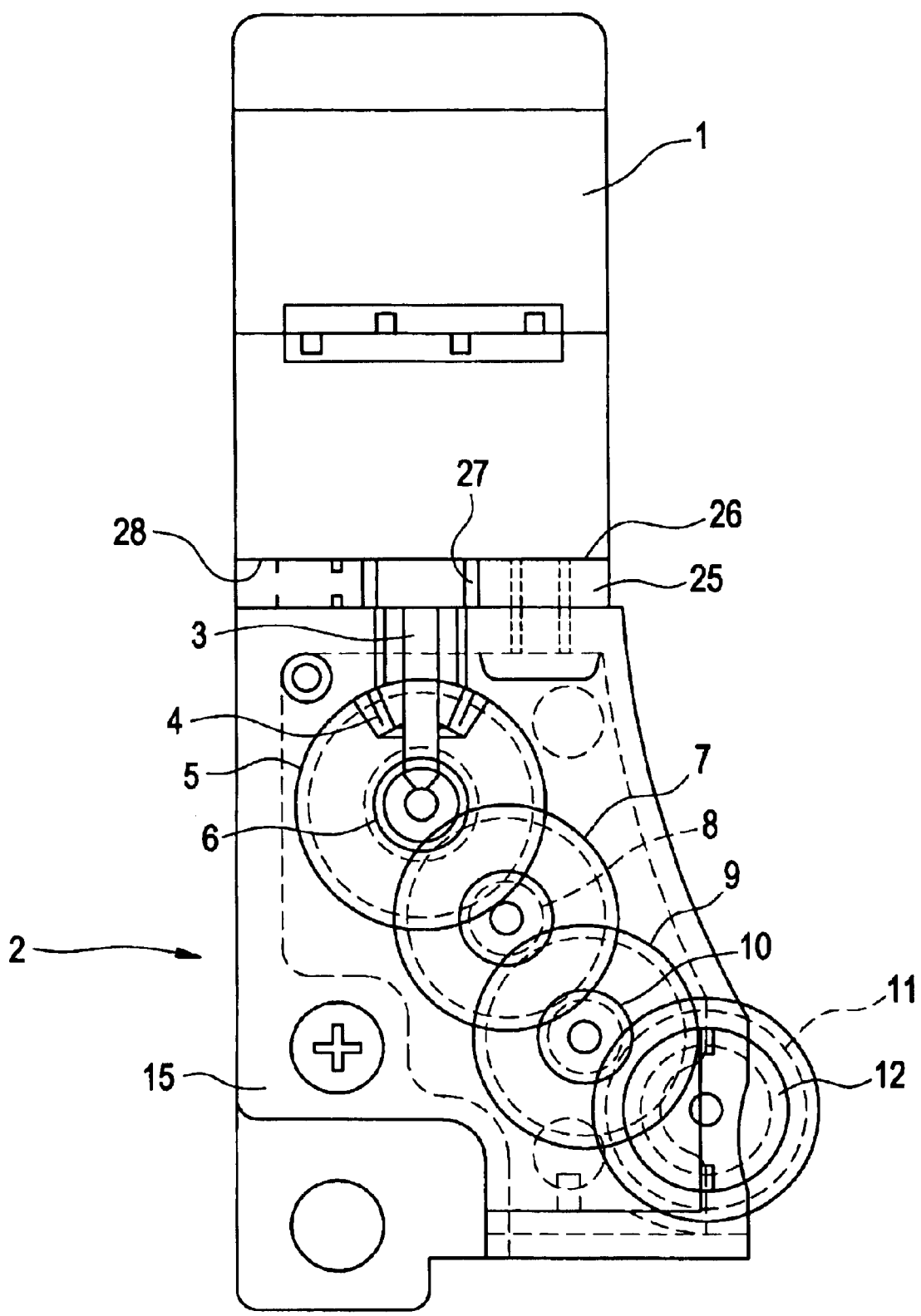
FIG. 1 is a front view showing an embodiment of a geared motor according to the present invention in a state that a casing is partially removed.
Figure 2:
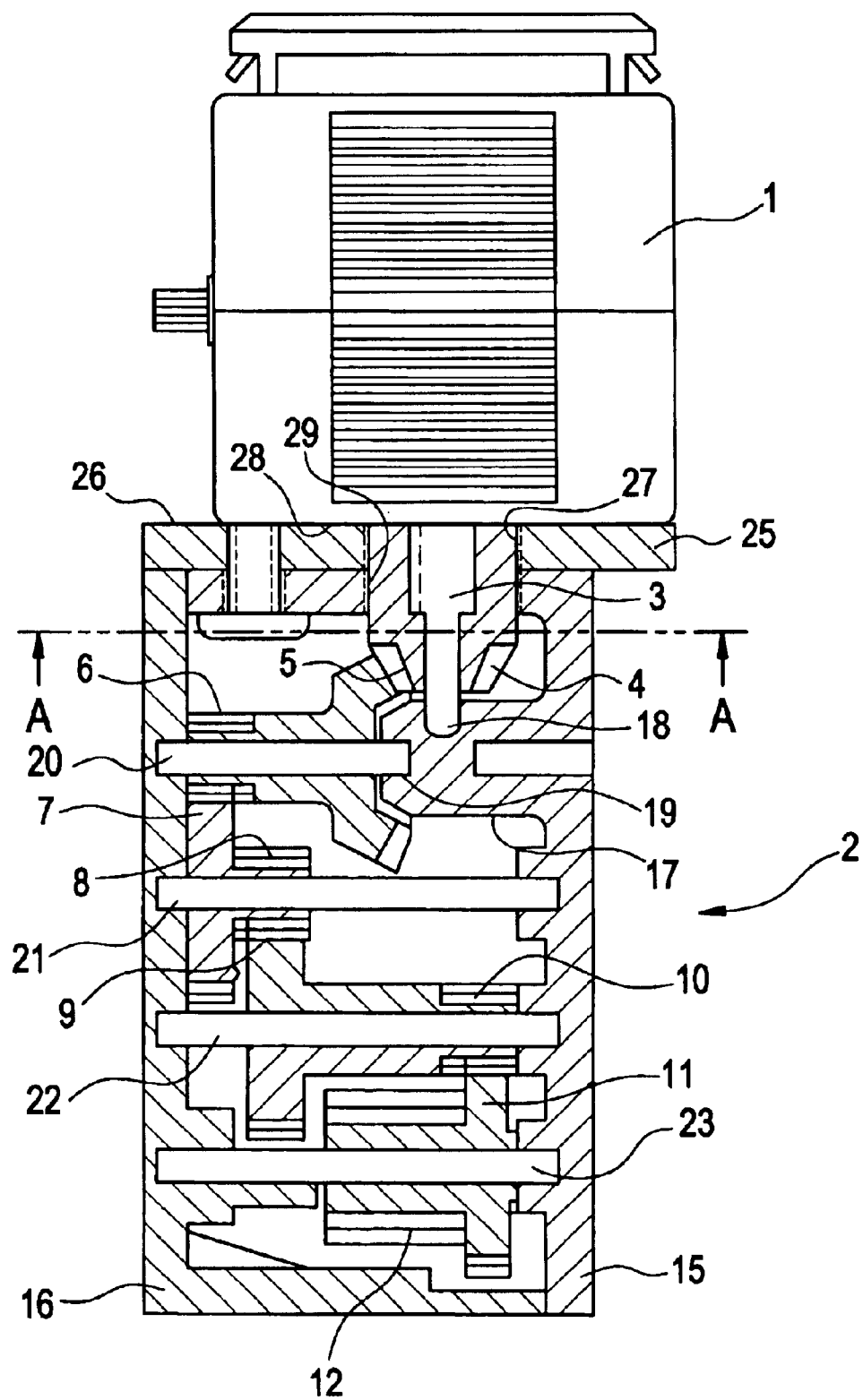
FIG. 2 is a right side view showing the FIG. 1 geared motor.
Figure 3:
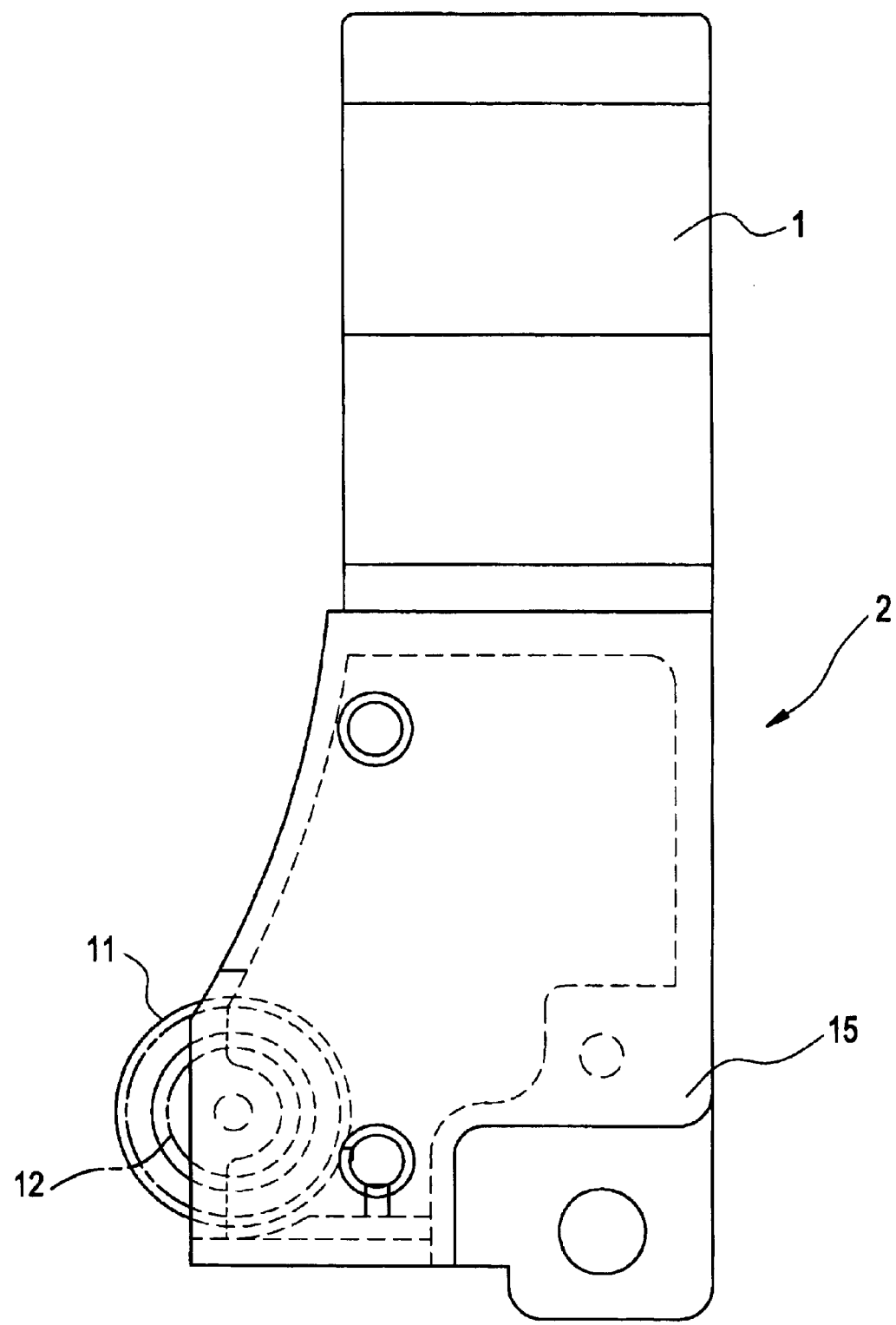
FIG. 3 is a rear view showing the FIG. 1 geared motor.
Figure 4:
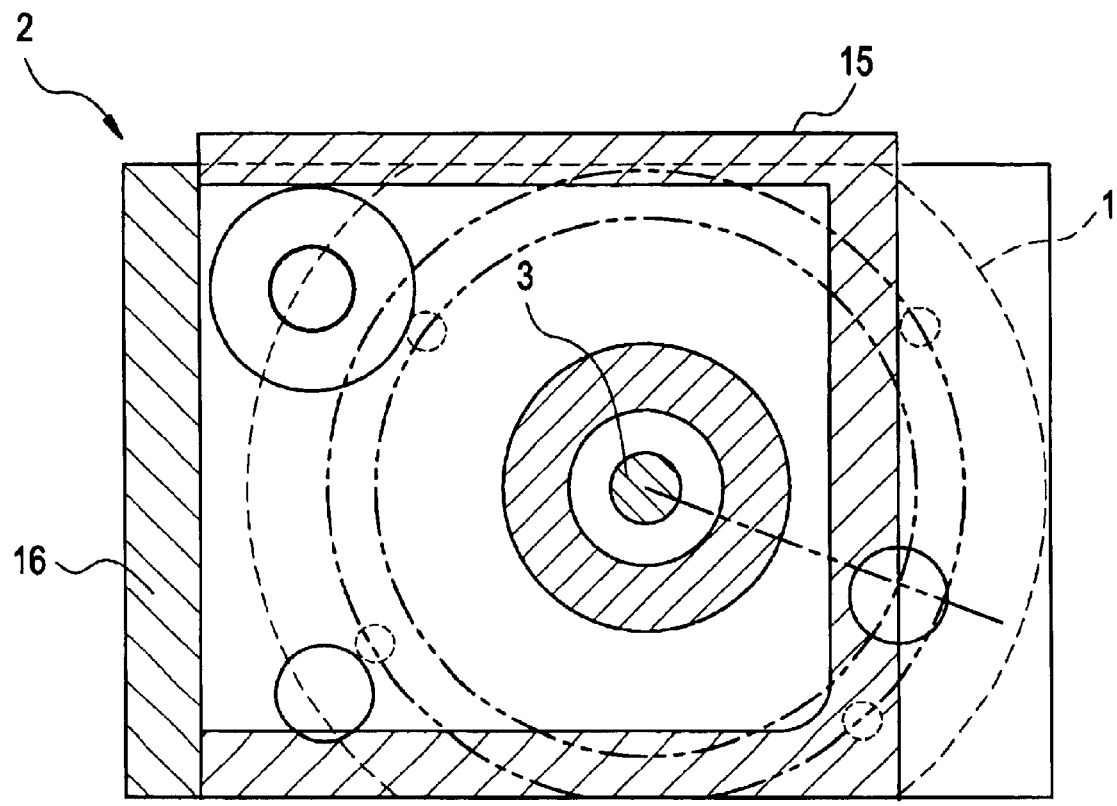
FIG. 4 is a cross sectional view taken on line A—A in FIG. 2.

The preferred embodiments of the geared motor according to the present invention will be described with reference to the accompanying drawings.

Referring to FIGS. 1 to 4, reference numeral 1 designates a motor unit, and numeral 2 designates a gear box which is fixed to one end of the motor unit 1. A plurality of transmission gears, as will be described later, are assembled into the gear box 2. Those gears are for transmitting a driving force from the motor unit 1 to the output part.

The gear box 2 includes a casing formed by coupling together a pair of casing halves 15 and 16. The casing covers the motor output shaft 3 of the motor unit 1 and the transmission gears. Shaft supporting parts are formed in the surfaces of the casing, which are opposed and parallel to each other and when the casing halves are coupled together. In this embodiment, four transmission gear shafts 20 to 23, while arranged in parallel, are supported at both ends on the shaft supporting parts of the casing halves 15 and 16.

The gear box 2 formed with the pair of casing halves 15 and 16 is fastened, by means of fastening means, e.g., screws, to one end face of the motor unit 1, with a coupling plate 25 being interposed therebetween. The coupling plate 25 includes a coupling surface 26, which is fastened to an output-side end surface 28 of the motor unit. The coupling surface 26 is arranged in parallel with the transmission gear shafts 20 to 23. An insertion hole 27 is formed passing through the coupling plate 25. The motor output shaft 3 of the motor unit 1 is inserted into the insertion hole 27, through the coupling surface 26. An insertion hole 29 for the output shaft 3 is also formed in a portion corresponding to the end plate of the casing half 15. A bevel gear 4 is fit to the output shaft 3, and those components are rotatable in unison. A cylindrical body part of the bevel gear 4 is inserted into those insertion holes 27 and 29.

A rotary body integrally formed with a second bevel gear 5 larger in diameter than the bevel gear 4 and a small-diameter spur gear 6 is fit to the transmission gear shaft 20. The bevel gear 4 is in mesh with the second bevel gear 5. A rotary body integrally formed with a large-diameter spur gear 7 and a small-diameter spur gear 8 is fit to another transmission gear shaft 21, and-the gears 6 and 7 are engaged with each other. A rotary body integrally formed with a large-diameter spur gear 9 and a small-diameter spur gear 10 is fit to yet another transmission gear shaft 22, and the gears 8 and 9 are engaged with each other. A rotary body integrally formed with a large-diameter spur gear 11 and a small-diameter spur gear 12 is fit to still another transmission gear shaft 23, and the gears 10 and 11 are engaged with each other.

A gear transmission system ranging from the bevel gear 4, the second bevel gear 5 to a bevel gear train containing the spur gears 6 to 12, forms a reduction gear transmission system. The gear 11 or 12 is partially exposed to outside so that the gear 11 or 12 located at the terminal end of the reduction gear transmission system serves as the output part of the geared motor. The shaft 20 of the second bevel gear 5 is perpendicular to the output shaft 3 of the motor unit 1 as the shaft of the bevel gear 4. The shafts of other gears are also oriented in a direction perpendicular to the output shaft 3 of the motor unit 1.

Accordingly, the transmission gear shafts 20 to 23 may be arranged on an imaginary prolonged line of the output shaft 3 of the motor unit 1. It is noted that this feature achieves the avoidance of the expanding of the transmission gear train in the width direction of the motor unit 1. In this embodiment, the transmission gear shafts 21 to 23, as shown in FIG. 1, are arranged along an arc, which extends toward the right lower side from the imaginary prolonged line of the output shaft 3 of the motor unit 1, and the spur gear train 7 to 12 is somewhat expanded in the width direction of the motor unit 1. Those gear shafts are so arranged in consideration of the assembling of the geared motor of the embodiment into a device to which the motor is to be assembled. Such an arrangement of the gear shafts is not essential, as a matter of course.

The shafts of the gears being in mesh with each other are oriented to be orthogonal to each other and ends of the gear shafts on one side are located close to each other. With this structural feature, the gear shafts are normally supported in a cantilever fashion. The cantilevered gear shafts are inferior in various mechanical properties, such as strength, rigidity, and stability. To avoid this disadvantage, it is preferable that the gear shafts are supported at both ends. In this respect, in this embodiment, the output shaft 3 of the motor unit 1 as the shaft of the bevel gear 4 and the shaft 20 of the second bevel gear 5 are both supported at both ends thereof. A structure to achieve the both-end support is provided in the form of a shaft support 17 which is projected from a part of the casing half 15 toward a position where the output shaft 3 and the shaft 20 of the second bevel gear 5 are located close to each other. The shaft support 17 includes a support part 18 for supporting a tip end of the output shaft 3 and a support part 19 for supporting a tip end of the shaft 20. The other end of the output shaft 3 is supported by a proper bearing on the side closer to the motor unit 1, and the other end of the shaft 20 is supported by a shaft support part of the casing half 16.

The casing halves 15 and 16 forming the gear box 2 may be formed by one-piece molding process, for example. In the structure that the resin receives the tip end of the output shaft 3 of the motor unit, a play of the bevel gear 4 in the radial direction is lessened.

In the illustrated embodiment, the shaft support parts for supporting the output shaft 3 of the motor unit 1 and the shaft 20 of the second bevel gear 5 are both formed in the casing. If required, one of those shafts 3 and 20 may be formed in the casing, and the other may be formed in an appropriate member other than the casing halves.

As shown in FIG. 1, the output shaft 3 of the motor unit 1 includes a stepped part, formed by making the output shaft 3 of the motor unit 1 different in diameter. The body part of the bevel gear 4 is fit to a portion of the output shaft 3 which includes the stepped part. The center hole of the bevel gear 4 includes a stepped part corresponding to the stepped part of the output shaft 3. One of those stepped parts abuts against the other. When the bevel gear 4 transmits a torque to the second bevel gear 5, a force acts in the thrust direction. In this case, the stepped part of the output shaft 3 functions as a thrust receiver, and positions the bevel gear 4 in the thrust direction.

Figure 5:
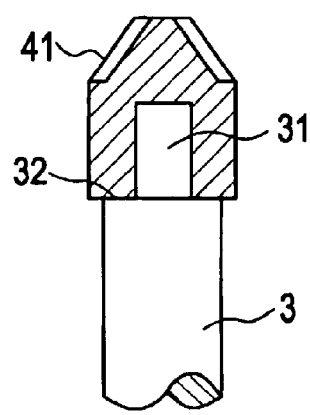
FIG. 5 is a front view, partially broken, showing a coupling structure of the motor output shaft and the bevel gear which is constructed according to the invention.
Figure 6:
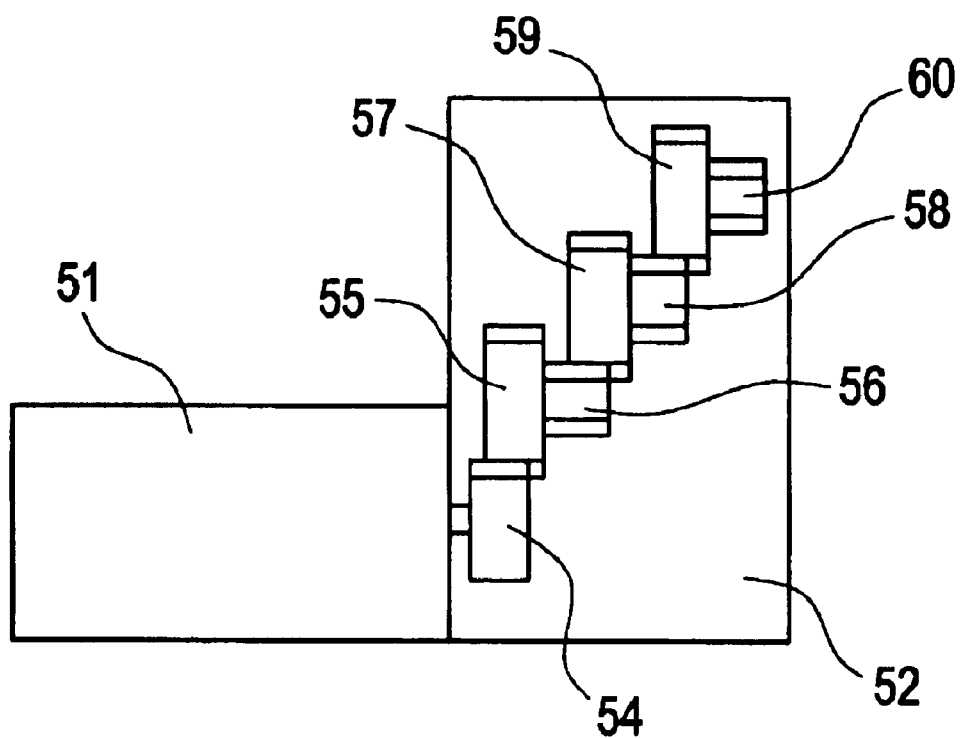
FIG. 6 is a conceptual figure showing a conventional geared motor.

Another structure to make the motor output shaft of the motor unit function as a thrust receiver for the bevel gear is illustrated in FIG. 5. In FIG. 5, the tip end of the output shaft 3 of the motor unit is worked to be a small-diameter part 31 and forms a stepped part 32. The body part of the bevel gear 41 is fit to the small diameter part 31, and the bevel gear 41 is rotated together with the output shaft 3. The stepped part 32 is made to abut against the end surface of the body part of the bevel gear 41, and a thrust force caused by the bevel gear 41 is received by the stepped part 32. In this instance, the tip end of the output shaft 3 is entirely covered with the bevel gear 41, and the output shaft 3 is supported in a cantilever fashion.

In the embodiment illustrated, the gear of the output shaft 3 of the motor unit 1 and the succeeding gear are bevel gears, and the shafts of those gears are orthogonally oriented. In an alternative, bevel gears may be disposed, while being orthogonally oriented in their shafts, in the middle of a transmission gear train consisting of a plurality of gears, which is for transmitting a driving force from the motor unit to the output part. In this case, to minimize the widthwise expansion of the geared motor, it is preferable that the output shaft 3 of the motor unit 1 and the shaft of the succeeding gear are orthogonally disposed as in the illustrated embodiment.

When the shafts of gears in the transmission gear train consisting a plurality of gears are made different in their orientation, it is preferable to orient the gear shafts in an orthogonal relation. However, there is no need of disposing the gear shafts in strictly orthogonally oriented relation, and those gear shafts may be slanted at some angle from their orientation when those are exactly orthogonal to each other.

Means for orienting in different directions the shafts of gears in the transmission gears train consisting of a plurality of gears may be means utilizing the intermeshing of the gears, or means utilizing the combination of a worm and a worm gear, or means utilizing the crown gear, spiral bevel gear, skew bevel gear or the like.

In the geared motor of the invention, the shaft direction of the body part of the motor unit may be coincident with the direction in which the transmission gear train is expands within the gear box. With this feature, the widthwise expansion of the geared motor may be reduced. It may be assembled into the device with a sufficient space. This feature contributes to the securing of the device compactness and good freedom of the geared motor mounting.

The shaft supporting parts for supporting both ends of it are formed in the casing. Therefore, a load acting on one shaft supporting part is lessened when comparing with the cantilever structure in which the shaft is supported by one shaft supporting part. Accordingly, the casing may be made of resin of low rigidity.

The other of the bevel gear and the second bevel gear is mounted on the motor output shaft. Therefore, it may take a cantilever structure utilizing the motor output shaft.

The motor output shaft includes a stepped part. In the transmission of a torque between the bevel gear and the second bevel gear, it may function as a thrust receiver for the other bevel gear. Therefore, it is capable of positioning the bevel gear in the thrust direction.

The shafts of the bevel gear and the second bevel gear are supported in double-supported fashions. The ends of the shafts of the bevel gear and the second bevel gear, which are located close to each other, are supported by the common shaft support. The shafts of both the bevel gears are held at high strength, rigidity, and stability. Further, use of the common shaft support leads to simplification of the construction.

What is claimed is:

1. A geared motor comprising:

a motor unit;

a plurality of transmission gears for transmitting a driving force from the motor unit to an output part, wherein said transmission gears includes a first bevel gear supported by a first shaft which is driven by the motor unit, and a second bevel gear meshing with said first bevel gear and supported by a second shaft oriented in a direction orthogonal to said first shaft of said first bevel gear; and a shaft support supporting one end of said first shaft and one end of said second shaft so that both ends of the first shaft and both ends of the second shaft are supported, wherein said shaft support is located at an intersection position of a longitudinal axis of said first shaft and a longitudinal axis of said second shaft which is perpendicular to the longitudinal axis of said first shaft.

2. The geared motor according to claim 1, further comprising:

a casing which covers said first and second shafts and said transmission gears, said casing including a pair of opposed walls opposed substantially in parallel with each other and a coupling surface being arranged substantially in parallel with said second shaft, wherein said shaft support is formed on and projects from one of said opposed walls of said casing; and an insertion hole penetrating said coupling surface, and an output-side end surface of said motor unit is fastened to said coupling surface.

3. The geared motor according to claim 2, wherein said casing is made of resin.

4. The geared motor according to claim 3, wherein said said first shaft comprises a motor output shaft of said motor unit.

5. The geared motor according to claim 4, wherein the motor output shaft of said motor unit includes a stepped part which serves as a thrust receiver for said second bevel gear.

6. The geared motor according to claim 2, wherein the other end of said second shaft is supported by a shaft supporting part formed in one of said opposed walls of said casing.

* * * * *